United States Patent Office 3,585,676
Patented June 22, 1971

3,585,676
MICROWAVE PROCESS FOR SHUCKING BIVALVE MOLLUSKS
Barry W. Spracklin, Wakefield, Mass., assignor to the United States of America as represented by the Secretary of the Interior
No Drawing. Filed July 17, 1969, Ser. No. 842,723
Int. Cl. A22c 29/00
U.S. Cl. 17—48                                    4 Claims

ABSTRACT OF THE DISCLOSURE

Bivalve mollusks are exposed to microwave radiation in doses of controlled duration and intensity to slightly open, or gape, their shells so that the flesh can easily be removed. Both single and multiple controlled exposures are employed effectively.

BACKGROUND OF THE INVENTION

Bivalve mollusks of many species are prized for the delectable and nutritious flesh harbored within their protective shells. Commensurate with the value of the prize obtained, the extracting, or shucking, of the flesh from bivalves, which include oysters, clams, scallops, and mussels, to name a few, is often a difficult and time consuming task, requiring calm reserves of skill and endurance. While steaming or other cooking of these shellfish diminishes the chore of shucking, there are those who savor the delicacy of the bivalve raw, and who object to even slight cooking of its flesh. Oysters are among the species so regarded, and to such extent that in a recent year ninety-nine percent of commercially processed oysters were shucked without heating to avoid the decrease in value which normally results from a heating process.

To appreciate the difficulty involved in shucking raw bivalve mollusks, an understanding of the apparatus by which the bivalve opens and closes its shell is helpful, for it is this apparatus which must be overcome in the shucking process. The oyster provides an appropriate example. Wedged in between the two half shells of the oyster, at their narrow ends, is an elastic pad, the hinge-ligament, which operates as a spring to gape, or bias the shells open when the oyster is at rest. When the shell is forcibly closed the ligament is squeezed between the half shells. When the shell is released, the ligament forces the free edges of the shell apart. The ligament is not alive, but is formed, like the shell itself, as an excretion from the living tissues of the oyster. Nor is the action of the ligament under the control of the animal. It keeps the shell gaped, or open, at all times, unless it is counteracted. For this reason an oyster at rest and undisturbed, or a dead oyster, always has its shell open.

The active work of squeezing the passive ligament and closing the shell is done by a large, powerful, adductor muscle, made up of a bundle of contractile fibers which are fastened between thhe inner surfaces of the half shells. When the oyster is disturbed, this powerful muscle contracts, tightly sealing the protective shell with exceptional force. It is in this disturbed state that the would-be shucker finds his quarry.

Armies of raw bivalve shuckers in the past have applied the tactic of force to separate the half-shells a distance sufficient to insert a knife for the fatal stroke which severs the adductor muscle from the shell. Wielding knives, hammers, saws and torches, they have attacked the tiny creatures with sustained vehemence. Mechanical shucking apparatus have been designed and implemented with little consistent success. Shock treatments have been applied in futile attempts to relax the adductor muscle and permit the hinge ligament to gape the sheel so that a knife could be inserted. Yet the bivalves have resisted with a tenacity that belies their size. Although the forceful hand-shucking process was poorly suited to the shucker's need, its use continued, since no suitable substitute could be found. It is against this background that this invention was made.

SUMMARY OF THE INVENTION

Exposure to microwave radiation in controlled doses has been found effective to gape bivalve mollusks without significant cooking or other undesirable organoleptic effect upon their flesh. Once the shell is gaped by this process a knife is easily inserted between the half shells to sever the adductor muscle, permitting access to the interior of the shell. The skill and force required to hand-shuck raw bivalves by application of controlled microwave radiation is substantially less than required in the conventional hand-shucking processes, yielding an economy of expense and effort not previously achieved. In addition, by mechanizing a difficult step of the shucking process, gaping overcomes a significant obstacle to the development of successful mechanical shucking apparatus.

Food preparation by microwave radiation is an emerging improvement in the culinary arts. Microwave ovens reduce the cooking time of many foods to a fraction of that required for conventional cooking processes. Speed is the salient feature of these ovens—they cook rapidly. Without doubt, the adaptability of these ovens to the cooking preparation of bivalve mollusks has been explored in depth, along with equivalent foods from the land and sea. Yet, in this invention the microwave oven, a cooking apparatus, is employed for the contradictory result of gaping raw bivalve mollusks *without* significant cooking. In this regard, bivalves gaped by the microwave process are indistinguishable in appearance, flavor, odor, and storage qualities from hand-shucked specimens.

Several variations of the microwave gaping process are included in this invention, each with its own peculiar advantages. A single sustained exposure to microwave radiation of controlled duration and intensity is effective to gape bivalve moluske. Multiple controlled exposures, spaced in time, are also effective. Continuous motion of the bivalves within the microwave radiation field enhances the effectiveness of each of these variations.

Therefore, one object of this invention is to gape bivalve mollusks by microwave radiation without significant cooking of their flesh.

Another object of this invention is to gape bivalve mollusks without significant cooking of their flesh by exposing them to a single sustained dose of microwave radiation of controlled duration and intensity.

Another object of this invention is to gape bivalve mollusks without significant cooking of their flesh by exposing them to multiple doses of microwave radiation which are spaced in time and of controlled duration and intensity.

Another object of this invention is to gape bivalve mollusks without significant cooking of their flesh by moving them within a field of microwave radiation of controlled duration and intensity.

Further objects will be apparent in the tenor of the following description of the preferred embodiments of the invention.

DESCRIPTION OF THE PREFERRED EMBODIMENT

In a process for shucking bivalve mollusks, the half-shells of the bivalve are first separated and then the flesh is removed from the shell. While the flesh is easily removed once the shell is open, before the shell can be opened the powerful adductor muscle of the bivalve must be overcome.

Any exposure of a bivalve to a sufficient dose of microwave radiation is effective to relax the adductor muscle, permitting easy access to the flesh. However, all doses of radiation do not produce uniform organoleptic effects upon the bivalve flesh. Doses of too high intensity or overlong duration result in undesirable cooking of the flesh. Yet carefully regulated doses of controlled duration and intensity gape the bivalve by relaxing its adductor muscle without significant cooking of its flesh.

Microwaves are electromagnetic waves about 1 to 30 inches long, occurring at frequencies of 400 to 20,000 megacycles per second. If microwaves are passed through a substance in alternate pulses of positive and negative fields they tend to align polar molecules (e.g. water) first in one direction and then in the opposite direction. Because of the speed at which the changing electrical field forces the polar molecules to rotate, multiple sites of friction generated heat occur simultaneously throughout the substance. A relatively uniform increase in the temperature of the substance results.

When a bivalve mollusk is exposed to the radiation field within an ordinary microwave oven, heating of the bivalve flesh, including the adductor muscle, results. At some point in the heating process the bivalve dies, or otherwise relaxes its adductor muscle, and gaping occurs. Intense radiation heats the flesh so rapidly that relaxation of the adductor muscle and cooking of the flesh appear to occur contemporaneously. The cooking and gaping processes blend into an indistinguishable entity. Since the normal application of microwave heating is directed toward cooking speed, the small duration between the gaping and cooking processes is easily exceeded and, consequently, overlooked. However, if the intensity and duration of exposure are carefully controlled, the heating process can be interrupted after gaping occurs, but prior to any significant cooking of the flesh.

Because microwave ovens heat substantially all parts of a homogeneous substance simultaneously, they provide a uniformity which is not ordinarily available from conventional heating processes. But even in microwave ovens, slightly uneven heating occurs, due to the heterogenous constituents of most substances. A cursory glance at a bivalve mollusk reveals that it is no exception to this phenomenon.

Uniform heating of the bivalve flesh produces a maximum gaping stimulus, with a minimum danger of overheating and cooking any portion. Slightly uneven heating of bivalves is not fatal to the microwave gaping process, though the bivalve, itself, does not fare so well. For maximum predictability in mass production applications, however, the attendant reduction of variable factors makes uniform heating desirable. Several methods for enhancing heating uniformity are available.

Uneven heating resulting from the heterogeneity of the bivalve can be counteracted by multiple exposures to microwave radiation with an equilibrating period in between. In the equilibrating, or rest, period the heat induced in the most susceptible portions of the bivalve flesh is conducted to the less susceptible portions. While the effect upon the adductor muscle is not completely understood, this form of exposure gapes the bivalve in less exposure time than required for a single sustained dosage.

Another cause of uneven microwave heating is the uneven radiation exposure given to different portions of the bivalve as a result of field gradients inherent in the design of microwave ovens. The effect of these gradients is easily reduced by moving the bivalve relative to the field as it heats. Small batches of bivalves can be moved in this way on a remote controlled, non-metallic turntable within a small oven, for example. Large, continuous process, microwave ovens employ conveyor belts which continuously transport the bivalves as an incident of their normal operation. Either method provides an acceptable result, and the methods can be combined to increase their efficiency.

In the past, speed has been the enemy of attempts to employ heat-related processes for gaping raw bivalves. This invention removes the impediment to understanding the failure of these processes. Knowledge of a distinct division between the gaping and cooking of heated bivalves enables experimental determination of the gaping threshold of the many species of bivalve mollusks which are consumed as food. To determine the required parameters of intensity and duration of exposure for a particular specie or size, the experimenter need only increase the exposure slowly to determine the point at which gaping without significant cooking occurs.

Commercially available microwave ovens are effective to gape bivalve mollusks by the process of this invention. The critical duration of exposure in an individual oven depends upon the size and species of bivalve being gaped, and upon the intensity of radiation emitted by the oven, itself-intensity being defined as a combination of frequency and power. Although these variable interrelationships prevent a detailed listing of a range of optimum exposure values for performing the process with the many types of ovens and species of of bivalve mollusks available, data is available to show values at which microwave gaping has been successfully performed upon oysters in both batch and continuous processes. More comprehensive tables of suitable duration and intensity of exposure values for the many microwave ovens and species of bivalve mollusks to which this process applies can easily be prepared by an experimental technician.

For batch processing, a commercially available 2,450 megahertz microwave oven having a power output of 1.5 kilowatts was used to gape oysters sufficiently to permit insertion of a knife. Batches of six oysters were processed in the oven on a metal-free, remotely controlled turntable, which was rotated during the exposure of the oysters to overcome the effects of nonuniform heating. Gaping occurred after both one and two-step exposures to the microwaves. In the two-step process, large oysters were gaped by exposure for 20 seconds and for 15 seconds with a 2-minute waiting period between exposures. In the one-step process, the time of exposure was somewhat less than in the two-step process—six large oysters were gaped in one 30-second treatment.

Continuous processing was performed with a 2,450 megahertz conveyor oven having a power output of 10-kilowatts from four independently controlled modules, each having an output of either 1.25 or 2.50 kilowatts. The conveying speed of the oven was adjustable, aiding the regulation of exposure duration. Two commercially recognized sizes of oysters—large and small—were processed separately. Trays containing about 3 pounds of a single size were placed on the conveyor belt and exposed to microwave radiation in a single 1-minute pass. Approximately 66 percent of the large oysters in a simple lot gaped after exposure for 1-minute at a power output of 3.75 kilowatts (three 1.25 kilowatt units operating), whereas 100 percent of the small oysters gaped under the same conditions. At a power output of 5.0 kilowatts (all four 1.25 kilowatt units operating), 100 percent of the large oysters gaped in the same time. Generally, increased power caused increased gaping for the same exposure time.

Continuous processing was also performed on large oysters at a constant output of 5.0 kilowatts for varying exposure times. A 40-second exposure resulted in 71 percent gaping; a 50-second exposure resulted in 80 percent gaping; and a 60-second exposure resulted in 100 percent gaping. Thus, a 50-percent increase in the exposure time was required to raise the percentage of gaped large oysters from 71 to 100 percent. As a general result, the number of oysters which were gaped increased as the exposure time was increased.

To ensure that none of the bivalves lose their raw appearance in a batch or continuous process, somewhat less than 100 percent gaping must be accepted. Nonetheless, between 90 and 95 percent gaping will normally take place after the maximum exposure for which a raw appearance of the bivalve can be maintained. The remaining ungaped bivalves are easily shucked by hand, and opening them requires no special skill.

Oyster meats obtained by the microwave process described above are organoleptically indistinguishable from meats obtained from hand-shucked controls. There is no significant cooking when the duration and intensity of exposure are properly controlled. In this regard, the significance of any cooking for the tests described above was measured by the sensual effect upon an observer, since it is the sensual effect which determines the marketability of the finished product.

Microwave gaping of bivalve mollusks, while only a single step in a larger whole, abates the most difficult step in the shucking process and enables the complete overhaul of prior method and apparatus. The reduction of required skill and effort allows new approaches to shucking which have not previously been possible. Machines, which to this time have been impeded by the gaping step in the shucking process, can now be developed to yield consistent results on an efficient and commercially acceptable basis. The ramifications of this invention are, therefore, limited only by the scope of the following claims.

What is claimed is:

1. A process for gaping raw bivalve mollusks without significant cooking of their flesh comprising:
exposing raw bivalve mollusks to multiple doses of microwave radiation of controlled intensity which are spaced in time from one another, and
interrupting the exposure of the bivalve mollusks to the multiple doses of microwave radiation after gaping occurs, but before significant cooking of their flesh occurs.

2. A process as recited in claim 1 in which the field of exposing further comprises moving the bivalve mollusks relative to the field of microwave radiation as the mollusks are irradiated.

3. A process for gaping raw bivalve mollusks without significant cooking of their flesh comprising:
exposing raw bivalve mollusks to multiple doses of microwave radiation which are spaced in time from one another,
regulating the intensity, spacing, and duration of the doses of microwave radiation to cause a measurable difference in the total amount of exposure time required for gaping and for significant cooking of the flesh of a substantial percentage of the bivalve mollusks so exposed, and
interrupting the exposure of the bivalve mollusks to the doses of microwave radiation after gaping of the substantial percentage of the bivalve mollusks occurs, but before significant cooking of their flesh occurs.

4. A process as recited in claim 3 in which the step of exposing further comprises moving the bivalve mollusks relative to the field of microwave radiation as the mollusks are irradiated.

References Cited
UNITED STATES PATENTS

| | | | |
|---|---|---|---|
| 3,070,834 | 1/1963 | Carpenter | 17—48 |
| 3,427,171 | 2/1969 | Jeppson | 99—221 |

LUCIE H. LAUDENSLAGER, Primary Examiner

U.S. Cl. X.R.

17—74; 99—221